United States Patent [19]

Doyle

[11] Patent Number: 4,687,020

[45] Date of Patent: Aug. 18, 1987

[54] FLUID MASS FLOW CONTROLLER

[76] Inventor: James H. Doyle, 1247 W. Grove Ave., Orange, Calif. 92665

[21] Appl. No.: 735,466

[22] Filed: May 17, 1985

[51] Int. Cl.$^4$ ............................................. F16K 31/02
[52] U.S. Cl. ................................. 137/486; 137/487.5
[58] Field of Search .............................. 137/486, 487.5

[56] References Cited

U.S. PATENT DOCUMENTS

| 3,601,124 | 8/1971 | Petree | 137/487.5 |
| 4,390,041 | 6/1983 | Reip | 137/488 |
| 4,476,893 | 10/1984 | Schwelm | 137/486 |
| 4,508,127 | 4/1985 | Thurston | 137/486 |

Primary Examiner—Alan Cohan
Attorney, Agent, or Firm—Fulwider, Patton, Rieber, Lee & Utecht

[57] ABSTRACT

A fluid mass flow controller for maintaining the flow of a fluid at a predetermined rate despite fluctuations in inlet fluid pressure. The controller employs a sensor to measure the rate of flow of the fluid downstream from a control valve; negative feedback is generated from the sensor output and is used to regulate the valve setting to maintain a constant flow at the predetermined rate.

11 Claims, 5 Drawing Figures

FLUID MASS FLOW CONTROLLER

BACKGROUND OF THE INVENTION

1. Field of the Invention

The present invention relates to fluid mass flow controllers, and in particular to controllers for maintaining a constant rate of flow of a fluid despite fluctuations in the fluid supply pressure.

2. The Prior Art

There are many processes that require precise control of the rate of flow of a fluid. For example, during fabrication of semiconductor wafers in a furnace, the motion and composition of the atmosphere within the furnace must be precisely controlled. Such control can be achieved by using a plurality of fluid mass flow controllers, one for each gas that is required for the particular process then being carried out. Each controller maintains the flow of its associated gas into the furnace at a predetermined rate, thereby maintaining the desired partial pressure of that gas in the furnace and preserving a smooth, steady motion of the atmosphere through the furnace.

In a typical fluid mass flow controller, the rate of flow of a gas is sensed and is compared with the desired rate. If the rate of flow as measured by the sensor does not coincide with the desired rate, a valve located down stream from the sensor is opened or closed as necessary to cause the actual rate of flow to equal the desired rate.

In a modern semiconductor manufacturing plant, several different furnaces may be operating at any one time and a different process may be taking place within each furnace, all under computer control. As a process being performed in a given furnace comes to an end, the computer may direct the flow controllers regulating the gases flowing into that furnace to shut off, or it may direct them to change the various rates of flow in preparation for another process. Each occurrence of a flow controller shutting off or changing a flow rate will cause the pressure throughout that controller's associated gas supply line to fluctuate, and this pressure fluctuation will be observable at the inlets to the other flow controllers connected to the same gas supply line.

Although existing flow controllers can accurately maintain a required rate of flow of a gas and can respond quickly to a computer command to change to a new rate of flow, they do not respond well to fluctuations in inlet pressure, especially at relatively low flow rates. A relatively small fluctuation in inlet pressure can result in a large fluctuation in the gas flow rate if the rate being maintained is relatively low. Such a fluctuation in gas flow can stir up particulate matter, ruining semiconductor wafers then being fabricated. In addition, if the affected gas is one that must be present in a precise quantity, such a large fluctuation can disrupt the fabrication process entirely. It will be apparent that better quality control and a higher yield could be achieved in the semiconductor manufacturing process if such fluctuations in gas flow rate could be prevented.

If the volume of gas between the sensor and the valve were to be made smaller, the effect of inlet pressure fluctuations on the gas flow rate would be reduced, and therefore it has been proposed to solve the problem by modifying the structure of the controller so as to greatly reduce this volume. However, the sensor cannot occupy the same space as the valve and hence it is not possible to eliminate this volume of gas entirely. Moreover, there are practical limits on how small the enclosing conduits can be made before susceptibility to clogging becomes significant. Accordingly, there are finite limits to how small the volume of gas between the sensor and the valve can be, and this proposed solution to the problem is not practical.

It will be apparent from the foregoing that there is a need for a fluid mass flow controller that can maintain a constant rate of flow of a fluid despite fluctuations in the pressure of the fluid at the inlet to the flow controller. The present invention satisfies this need.

SUMMARY OF THE INVENTION

The present invention resides in a fluid mass flow controller that uses negative feedback to reduce the effects of inlet pressure fluctuations on the output fluid flow rate. Briefly, the apparatus of the invention comprises a flow controller having a valve, a sensor located downstream from the valve, and an electronic control circuit. Unlike prior art flow controllers, in the present invention the actual rate of fluid flow is measured after the fluid has passed through the valve, and this information is processed by the electronic control circuit and fed back to the valve to open or close it as necessary to adjust the measured flow rate to be equal to the desired flow rate.

The use of negative feedback dramatically eliminates the effects of inlet pressure fluctuations on output flow rates. A relatively slight fluctuation in gas inlet pressure has no measurable effect on the output flow from the controller. Even in the face of a total interruption of the gas supply, the flow rate remains constant as long as possible and then smoothly drops off.

It will be appreciated from the foregoing that the present invention represents a significant advance in mass fluid flow controllers in that the effects of inlet pressure fluctuations on output flow rates are virtually eliminated.

Other aspects and advantages of the present invention will become apparent from the following more detailed description taken in conjunction with the accompanying drawings.

DESCRIPTION OF THE PREFERRED EMBODIMENT

Prior art mass fluid flow controllers are subject to wide variations in output flow rate as a result of fluctuations in inlet pressure. The present invention uses negative feedback to virtually eliminate the effects of inlet pressure fluctuations on output flow rate.

Figure 1:
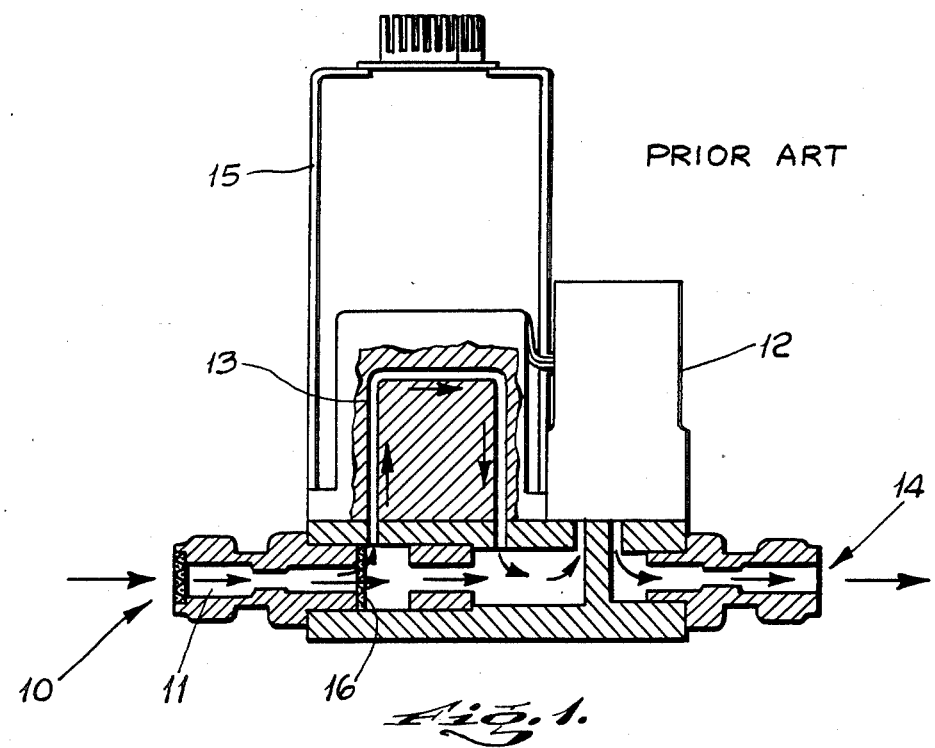
FIG. 1 is a diagram of a prior art fluid mass flow controller.

A diagram of a typical flow controller according to the prior art is shown in FIG. 1. A gas, such as nitrogen or oxygen, enters the controller through an inlet 10 and flows through a conduit 11 into a valve 12. A small portion of the gas is diverted to flow through a sensor tube 13 on its way to the valve 12. The gas exits the valve 12 through an outlet 14 and thence flows into the furnace. The sensor tube 13 contains a sensor (not shown) that measures the rate of flow of the gas. If the measured rate of flow is not the same as the desired rate, a control circuit 15 generates a control signal that causes the valve 12 to open or close as necessary to adjust the rate of flow until it is equal to the desired rate. A screen 16 may be positioned across the inlet 10.

Figure 2:
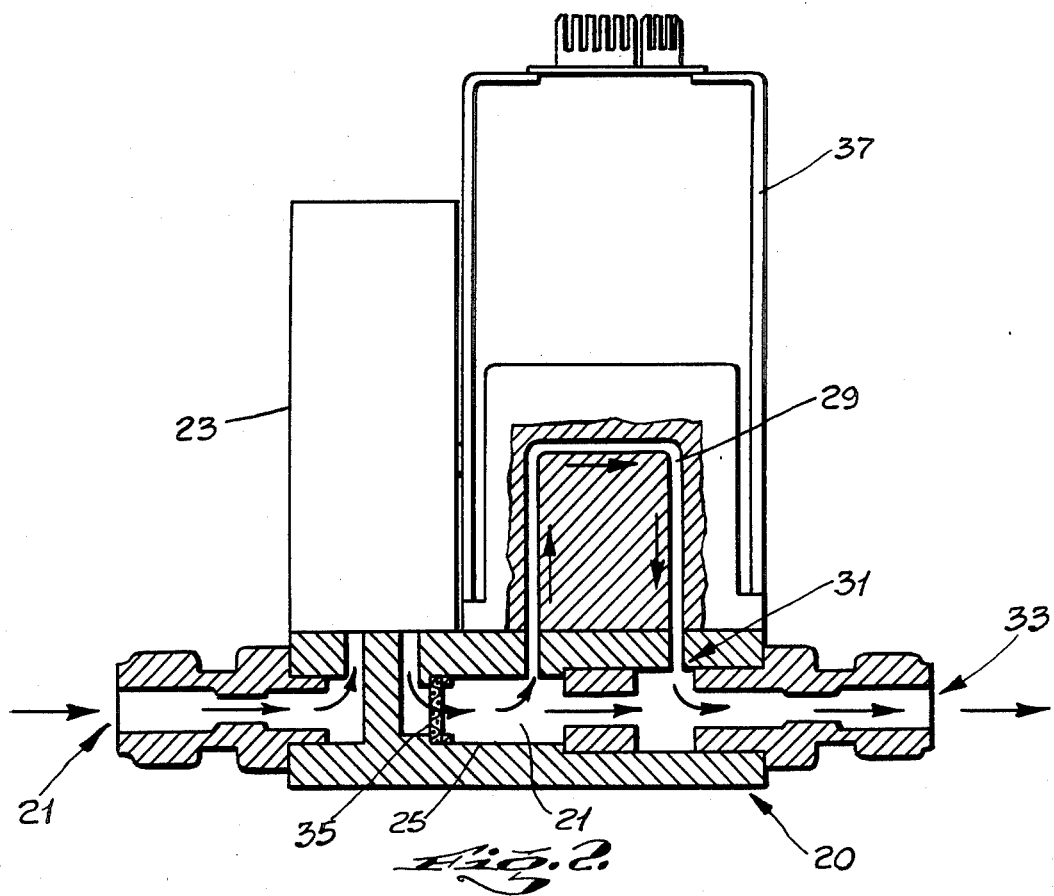
FIG. 2 is a diagram of a fluid mass flow controller according to the present invention.

In accordance with the invention, a flow controller designated generally at 20 has an inlet 21 for receiving a fluid from a fluid supply line (not shown), as illustrated in FIG. 2. The inlet 21 is connected to a control valve 23, and the valve 23 in turn is connected to a conduit 25. Downstream from the valve 23, the conduit 25 has a diversion junction 27, and a small quantity of fluid is diverted into a sensor tube 29 at the junction 27. The sensor tube 29 contains a sensor element (not shown) that measures the rate of flow of fluid through the sensor tube 29. Downstream from the sensor element, the sensor tube 29 rejoins the conduit 25 at a junction point 31, and the conduit 25 terminates downstream from the junction point 31 at an outlet 33, from which the fluid flows out of the controller. Optionally, a fluid flow stabilizer 35, such as a fine-mesh wire screen, is inserted in the conduit 25 upstream from the diversion junction 27 to eliminate turbulence in the fluid as it flows through the junction 27. A control circuit 37 applies a negative feedback signal from the sensor element to the valve 23, causing the valve 23 to open or close as necessary to maintain the actual rate of fluid flow equal to a predetermined rate.

Figure 3:
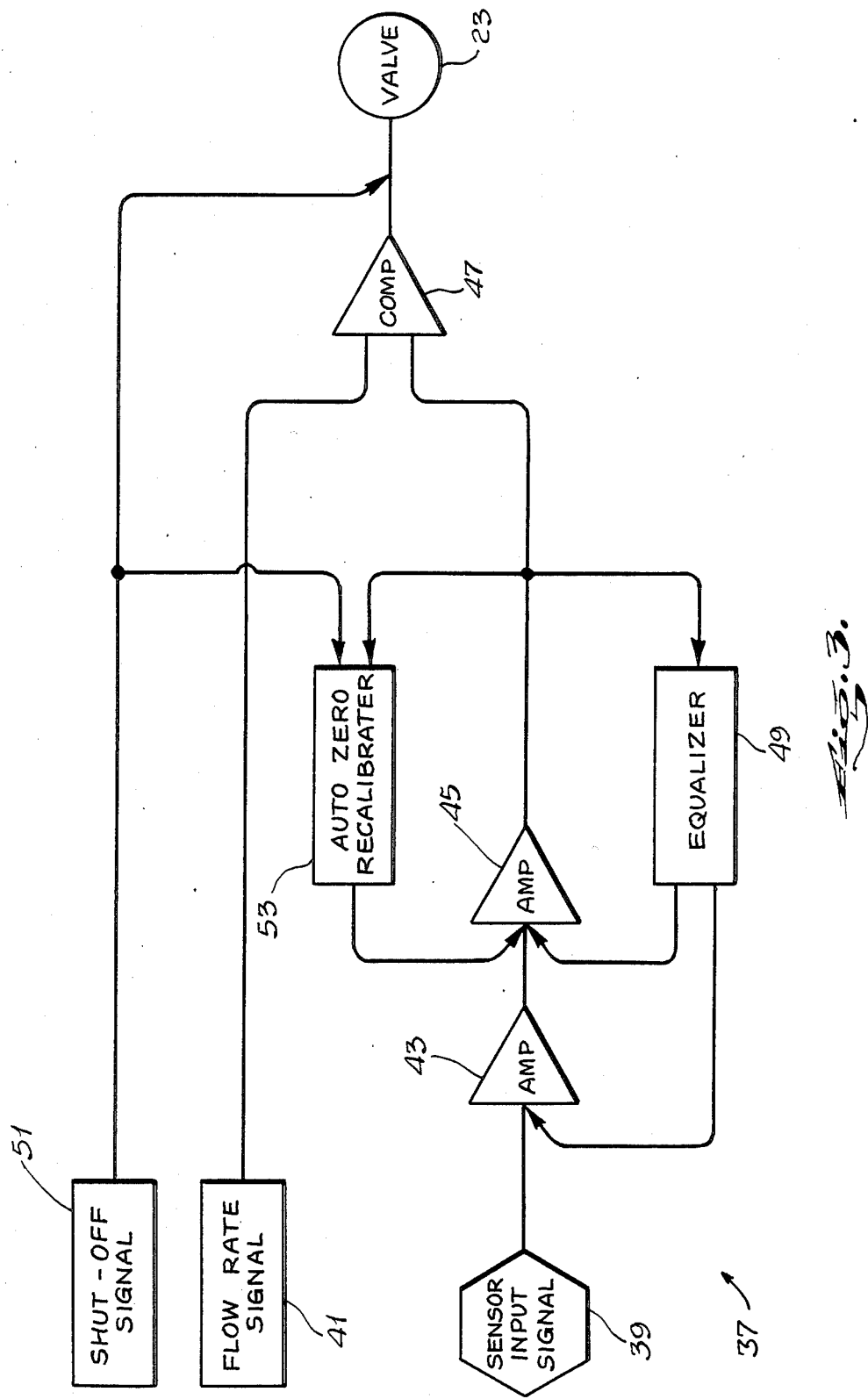
FIG. 3 is a block diagram of an electronic control circuit of a flow controller according to the present invention.

The control circuit 37, shown in block diagram form in FIG. 3, receives at block 39 an electrical input signal from the sensor element representing the measured rate of flow of the fluid. At block 41 an electrical control signal representing the desired flow rate is received from a computer or other control source. The sensor signal is amplified in amplifiers 43 and 45 and is then compared with the control signal in a comparator 47. If the measured flow rate is not equal to the desired flow rate, the comparator 47 generates an error signal that is applied to the valve 23, causing the valve 23 to open or close as necessary to cause the actual flow rate to equal the desired flow rate. An equalizer 49 compensates for non-linearity of the sensor element. A valve shut-off signal can be received at block 51, and such a signal overrides the comparator 47, causing the valve 23 to close. The valve shut-off signal also activates an optional automatic zero recalibrator 53 to correct for long term sensor drift.

Figure 4:
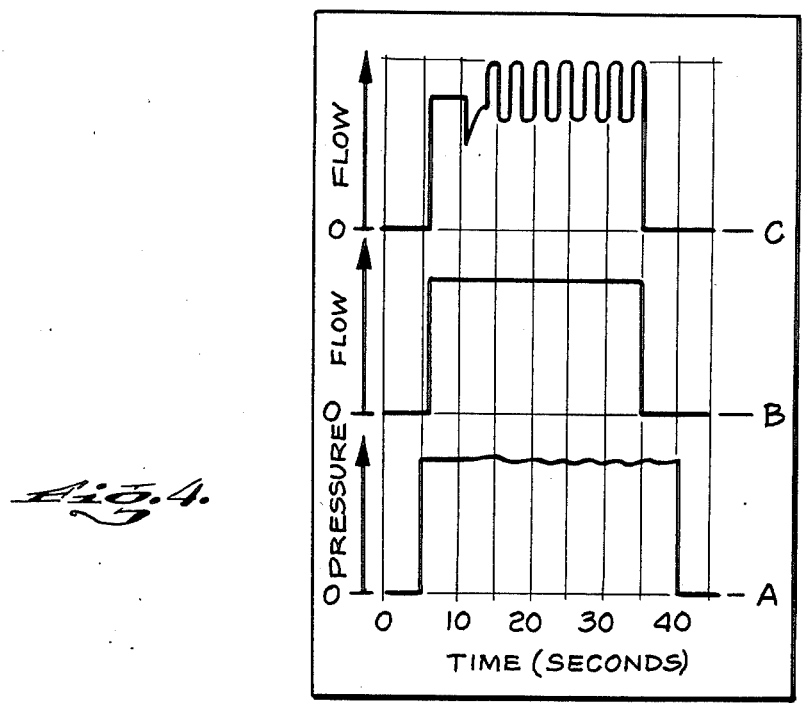
FIG. 4 is a graph showing the effect of fluctuations in gas pressure at the inlet of a flow controller on the output flow rate from a controller according to the prior art and from a controller according to the present invention.

The improvement in performance that can be achieved by a flow controller embodying the present invention is shown in graphic form in FIG. 4. A pressure fluctuation of only plus or minus one percent in a gas inlet pressure of 25 pounds per square inch (FIG. 4A) causes the output flow from a prior art controller set for a flow rate of 10 milliliters per minute to jump 18 percent above and below the desired rate, (FIG. 4C) but has no measurable effect on the output flow from a controller according to the present invention (FIG. 4B).

Figure 5:
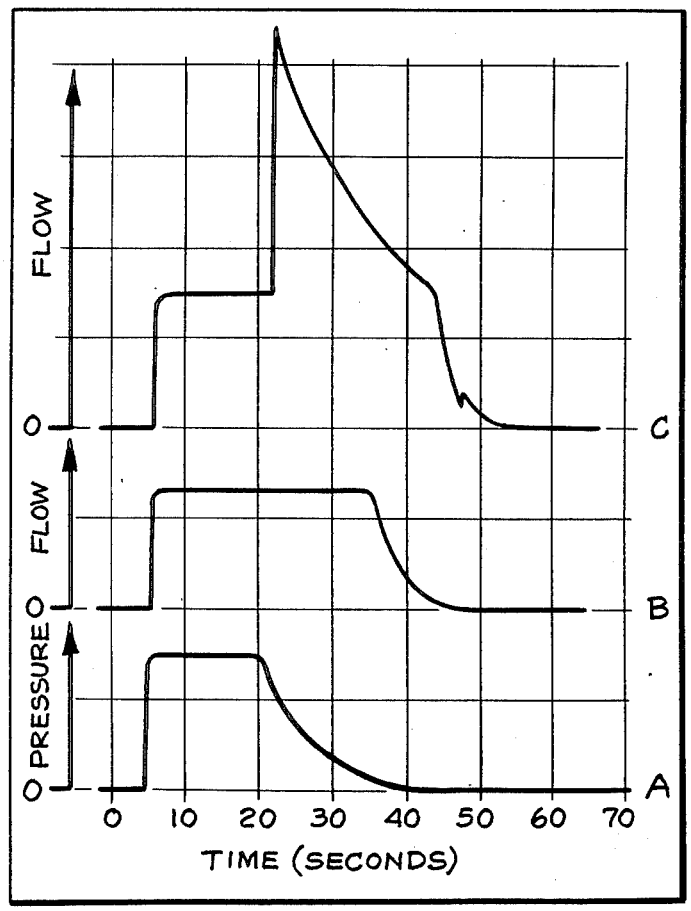
FIG. 5 is a graph showing the effect of a cessation of gas flow at the inlet of a flow controller on the output flow rate from a controller according to the prior art and from a controller according to the present invention.

A total interruption of a gas supply at the same initial inlet pressure (FIG. 5A) causes the output flow from a prior art controller to momentarily skyrocket to 31 milliliters per minute before plunging to zero (FIG. 5C), whereas the output from a controller according to the present invention remains constant as long as possible and then smoothly drops off (FIG. 5B).

A fluid mass flow controller according to the present invention maintains a predetermined constant rate of fluid flow virtually unaffected by fluctuations in inlet fluid pressure. Such a controller significantly improves yield and quality control in semiconductor fabrication processes and can produce corresponding benefits in other processes that require the precise control of the rate of flow of a fluid.

Although one specific embodiment of this invention has been described and illustrated, it is to be understood that the invention is not to be limited to the specific forms or arrangements of parts so described and illustrated. In addition, although the invention has been disclosed with reference to semiconductor fabrication processes, the invention has other applications. It is therefore to be understood that, within the scope of the appended claims, the invention may be practiced otherwise than as specifically described.

I claim:

1. A gas mass flow controller comprising:

a gas control valve responsive to a control signal to vary the rate of flow of a gas therethrough;

conduit means, defining a primary gas flow path, in communication with the valve;

gas flow dividing means, located downstream from the valve in the primary flow path, operative to divert a portion of the gas from the primary flow path;

sensor conduit means, in communication with the dividing means, defining an alternate gas flow path for receiving the diverted portion of the gas;

sensing means, downstream from the dividing means, for sensing the rate of flow of the gas through the alternate flow path and for providing a sensor input signal indicative of the rate of flow of the gas;

means, downstream from the sensing means, for merging the gas flowing in the alternate flow path into the gas flowing in the primary flow path;

control means, responsive to the sensing means to generate the control signal, the control means including amplifier means to amplify the sensor input signal, means to receive a flow rate signal indicative of a desired rate of flow of the gas, and comparator means to compare the amplified sensor signal with the flow rate signal and to provide the control signal indicative of any difference therebetween;

means to apply the control signal to the valve to maintain the flow of the gas through the primary flow path at a rate equal to the desired rate of flow as indicated by the flow rate signal; and an automatic zero recalibrator, responsive to the amplified sensor signal and to a valve shut-off signal to correct for any long term sensor drift.

2. A gas mass flow controller according to claim 1, comprising in addition means in the primary flow path, upstream from the dividing means, for reducing tubulence in the gas.

3. A gas mass flow controller comprising:

a gas control valve responsive to a control signal to vary the rate of flow of a gas therethrough;

conduit means, defining a primary gas flow path, in communication with the valve;

gas flow dividing means, located downstream from the valve in the primary flow path, operative to divert a portion of the gas from the primary flow path;

sensor conduit means, in communication with the dividing means, defining an alternate gas flow path for receiving the diverted portion of the gas;

sensing means, downstream from the dividing means, for sensing the rate of flow of the gas through the alternate flow path and for providing a sensor input signal indicative of the rate of flow of the gas;

means, downstream from the sensing means, for merging the gas flowing in the alternate flow path into the gas flowing in the primary flow path;

control means, responsive to the sensing means to generate the control signal, the control means including amplifier means to amplify the sensor input signal, means to receive a flow rate signal indicative of a desired rate of flow of the gas, and comparator means to compare the amplified sensor signal with the flow rate signal and to provide the control signal indicative of any difference therebetween;

means to apply the control signal to the valve to maintain the flow of the gas through the primary flow path at a rate equal to the desired rate of flow as indicated by the flow rate signal; and an equalizer in electrical communication with the amplifier means, responsive to the amplified sensor signal to compensate for any non-linearity of the sensing means.

4. A gas mass flow controller according to claim 3 wherein the amplifier means comprises a plurality of amplifier stages and wherein the equalizer is in communication with each of a plurality of said stages.

5. A gas mass flow controller according to claim 4 and further comprising an automatic zero recalibrator, responsive to the amplified sensor signal and to a valve shut-off signal to correct for any long term sensor drift.

6. A gas mass flow controller, responsive to an externally generated flow rate signal indicative of a desired rate of flow of a gas to control the actual rate of flow of a gas in conformity with said desired rate, the controller comprising:

a control valve to receive a gas, responsive to a control signal to vary the rate of flow of the gas therethrough;

conduit means, defining a primary gas flow path, in communication with the valve to receive the gas therefrom;

sensor conduit means, defining an alternate gas flow path, in communication with the conduit means to receive a portion of the gas flowing therethrough;

sensing means, operative to sense the rate of flow of the gas through the alternate flow path and to provide a sensor input signal indicative of said rate of flow;

amplifier means to amplify the sensor input signal;

comparator means, operative to compare the amplified sensor signal with the flow rate signal and to provide said control signal indicative of any difference therebetween;

means to apply the control signal to the valve to maintain the flow of the gas through the primary flow path at the deisred rate of flow; and an automatic zero recalibrator, responsive to the amplified sensor signal and to a valve shut-off signal to correct for any long term sonsor drift.

7. A gas mass flow controller, responsive to an externally generated flow rate signal indicative of a desired rate of flow of a gas to control the actual rate of flow of a gas in conformity with said desired rate, the controller comprising:

a control valve to receive a gas, responsive to a control signal to vary the rate of flow of the gas therethrough;

conduit means, defining a primary gas flow path, in communication with the valve to receive the gas therefrom;

sensor conduit means, defining an alternate gas flow path, in communication with the conduit means to receive a portion of the gas flowing therethrough;

sensing means, operative to sense the rate of flow of the gas through the alternate flow path and to provide a sensor input signal indicative of said rate of flow;

amplifier means to amplify the sensor input signal;

comparator means, operative to compare the amplified sensor signal with the flow rate signal and to provide said control signal indicative of any difference therebetween;

means to apply the control signal to the valve to maintain the flow of the gas through the primary flow path at the deisred rate of flow; and an equalizer in electrical communication with the amplifier means, responsive to the amplified sensor signal to compensate for any non-linearity of the sensing means.

8. A gas mass flow controller according to claim 7 wherein the amplifier means comprises a plurality of amplifier stages and wherein the equalizer is in communication with each of a plurality of said stages.

9. A gas mass flow controller according to claim 8 and further comprising an automatic zero recalibrator, responsive to the amplified sensor signal and to a valve shut-off signal to correct for any long term sensor drift.

10. A gas mass flow controller according to claim 6 and further comprising means, downstream from the sensing means, for merging the gas flowing in the alternate flow path into the gas flowing in the primary flow path.

11. A gas mass flow controller according to claim 7 and further comprising means, downstream from the sensing means, for merging the gas flowing in the alternate flow path into the gas flowing in the primary flow path.

* * * * *